T. Hatfield,

Vegetable Cutter,

PATENTED
JAN 7 1868

No. 73004

Witnesses,
Jas. Marquet
A. Haynard

Inventor,
T. Hatfield
By his attorney
G. S. Chapin

United States Patent Office.

T. J. HATFIELD, OF WARSAW, INDIANA.

Letters Patent No. 73,004, dated January 7, 1868.

IMPROVED VEGETABLE-CUTTER.

*The Schedule referred to in these Letters Patent and making part of the same.*

TO ALL WHOM IT MAY CONCERN:

Be it known that I, T. J. HATFIELD, of Warsaw, in the county of Kosciusko, and in the State of Indiana, have invented an Improved Vegetable-Cutter; and I do hereby declare that the following is a full and exact description thereof, reference being had to the accompanying drawings, and to the letters of reference marked thereon, making a part of this specification, in which—

Figure 1:
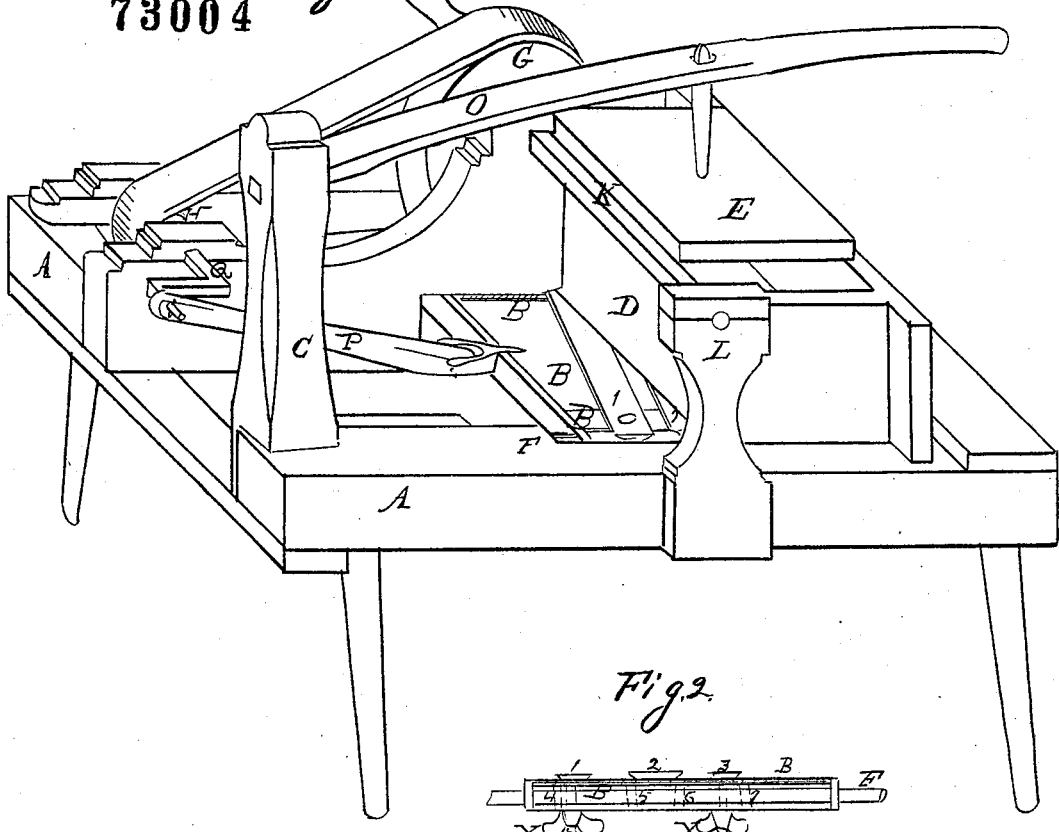

Figure 1 is a perspective representation of my invention.

Figure 2:
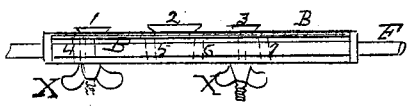

Figure 2, a longitudinal sectional elevation of the cutting-device.

The nature of my invention consists in the use of a stationary box for holding vegetables to be cut, and a follower, attached to a spring-lever, and arranged to force the vegetables downward as fast as cut; and, further, in the use of adjustable knives, attached to a reciprocating bed, operated by crank-pitman and pulleys.

In order to give a correct understanding of my invention, I have marked corresponding parts with similar letters, and will now give a detailed description.

A A represent a substantial frame, made of wood or iron, which supports the various parts of my invention. D is the box, made of wood, and arranged to hold such an amount of vegetables as deemed most convenient, and is fixed to the frame A A directly over the bed B; and for the convenience of holding the vegetables down upon the cutters, 1 2 3, a follower, E, is hung to a spring-lever, o, attached to a stationary standard, C, arranged for the purpose. By this means the vegetables can be held in a compressed state when being cut, and the follower E removed from box D without the necessity of raising it out by force, as spring-lever o is fully sufficient for the purpose.

The cutting-devices are the most important part of my invention, and are as follows: A bed-piece, B, is made to slide on rods F, shown at figs. 1 and 2, (or tongues, if more desirable,) by means of pitman P, crank Q, and gearing H G. This bed-piece B has openings through it, as seen by dotted lines 4 5 6 7, for the sliced vegetables to pass through, and fall down into any convenient receptacle, placed under frame A A, and has also two metallic plates, B' B', embedded in it, near its sides, for the purpose of supporting the knives 1 2 3, rigidly attached to said plates, and arranged to be raised or lowered, as the case may require, for cutting different-sized slices, by means of common set-screws, X X, put through the bed B, and into said plates. This is a simple arrangement, yet important for the purpose designed; for if the cutters or knives 1 2 3 cannot be set to cut different thicknesses, they would not answer a general purpose.

The operation is simple, consisting in raising the knives 1 2 3 to cut slices of the thickness desired, after which the box D can be filled, and its contents held in place by follower E and lever o. The motion is given to bed-piece B by means of crank W.

Having thus fully described my invention, what I claim is—

The combination of the reciprocating bed B, adjustable knives 1 2 3, plates B' B', arranged with set-screws X X, box D, follower E, and spring-lever o, substantially as and for the purpose herein set forth.

T. J. HATFIELD.

Witnesses:
   JAS. NOQUET,
   A. HAYWARD.